United States Patent
Mani et al.

[11] Patent Number: 5,848,406
[45] Date of Patent: Dec. 8, 1998

[54] METHOD FOR PRESENTING INFORMATION ON DISPLAY DEVICES OF VARYING SIZES

[75] Inventors: Viswanthan Subra Mani, New York, N.Y.; Rafael Alonso, Cranbury, N.J.

[73] Assignee: Matsushita Electric Industrial Co., Ltd., Osaka, Japan

[21] Appl. No.: 707,214

[22] Filed: Sep. 3, 1996

[51] Int. Cl.$^6$ .................................................. G06F 17/30
[52] U.S. Cl. ................................................ 707/2; 707/5
[58] Field of Search .................................. 707/2, 5, 1; 1/1

[56] References Cited

U.S. PATENT DOCUMENTS

| | | | |
|---|---|---|---|
| 5,519,859 | 5/1996 | Grace ............................................ | 707/3 |
| 5,550,971 | 8/1996 | Brunner et al. .............................. | 707/3 |
| 5,615,367 | 3/1997 | Bennett et al. .......................... | 707/102 |
| 5,701,453 | 7/1993 | Maloney et al. ......................... | 395/602 |
| 5,713,020 | 1/1998 | Reiter et al. ............................. | 395/613 |

*Primary Examiner*—Thomas G. Black
*Assistant Examiner*—Jack M. Choules
*Attorney, Agent, or Firm*—Harness, Dickey & Pierce, P.L.C.

[57] ABSTRACT

A method for presenting information on display devices of varying sizes. The method processes a query of a database and determines which tables are most likely to contain information which the user wishes to primarily view. The join relationships between tables of the database are used to determine the priority for displaying tables. Those join relationships which were used more frequently in previous queries are accorded higher weight scores and correspondingly have a greater chance of being prioritized to be displayed on the computer screen. Also, a user may select a particular table to be focused upon. In that situation, the method displays not only the focused table but also the tables with a direct relationship to it.

24 Claims, 8 Drawing Sheets

| R1. Employee Grade | R1. Employee ID | R2. Salary | R4. Employee Name | R4. Work Phone Number |
|---|---|---|---|---|
| 1 | 354 | $15,000 | R. Copston | (315) 575-2423 |
| 1 | 355 | $15,000 | K. Harrington | (315) 575-2599 |
| 1 | 356 | $15,000 | N. Sagy | (315) 575-2589 |
| 2 | 320 | $15,500 | J. Peters | (315) 575-2502 |
| 2 | 322 | $15,500 | O. Smith | (315) 575-2523 |
| 2 | 327 | $15,500 | Y. Timms | (315) 575-2587 |
| 2 | 328 | $15,500 | A. Gibson | (315) 575-2500 |
| 3 | 301 | $15,750 | T. Burke | (315) 575-2501 |
| * | * | * | * | * |
| * | * | * | * | * |
| * | * | * | * | * |
| 3 | 302 | $15,750 | K. Niems | (315) 575-2534 |
| 20 | 1 | $150,000 | B. Williams | (315) 575-2543 |

580

590

600

METHOD FOR PRESENTING INFORMATION ON DISPLAY DEVICES OF VARYING SIZES

BACKGROUND OF THE INVENTION

1. Field of the Invention

The present invention relates generally to computer databases and more particularly to presenting information on display devices of varying sizes.

2. Discussion

Traditionally, display devices for computer systems have been of the same approximate size. For example, the usual display device consists of a monitor whose overall dimensions are similar to those of consumer-oriented television sets. The size of standard monitor screens (about 13 to 19 inches diagonally) has been assumed (implicitly or explicitly) by most interface designers. The result of this is that much of the previous work on interfaces (in particular interfaces to information systems) does not scale well to displays of smaller than usual size.

Examples of where this is true are mobile computers, pen computers, and PDAs. The current small display sizes of these machines give rise to the problem of trying to display large amounts of data in a very limited area, and doing so without sacrificing clarity and coherence. Clearly, one solution is to simply show all the data on the screen and have the user navigate (using scrollbars, for instance) through all the information. Anyone who has had to scroll through large amounts of data in this fashion knows how frustrating this process can become. Furthermore, this approach has the effect of very quickly confusing the user, especially in situations where the information items displayed contiguously on the screen are not logically related to each other.

In the area of hypertext, the relevant research issues are more in the nature of helping the user keep track of their place while reading the hypertext information. In that context the use of Overview Diagrams has been suggested (see for example, J. Nielsen, The art of navigating through hypertext, *Communications of the ACM*, 33(3), March 1990). This is a technique for providing a high-level view of the information. However, overview diagrams are not generated automatically, they provide information about the entire document, and are not dependent on any database-related information.

In the area of database interfaces, the main emphasis has been the creation of easy-to-use interfaces. For example, the PICASSO graphical interface provided a tool for inexperienced users to graphically enter database queries and receive information about the semantics of their query (Please see, H.-J. Kim, H. F. Korth, and A. Silberschatz, PICASSO: a graphical query language, *Software Practice and Experience*, 18(3):169–203, March 1988).

The designer of QBE (Query by Example) provided an interface allowing users to visually query a database by providing an example of the type of answer they were looking for (see, M. M. Zloof. OBE/QBE: A language for office and business automation, *IEEE Computer, pages* 13–22, May 1981).

Other systems such as OdeView do make use of semantic links to offer the user possible query paths (Please see, R. Agrawal, N. H. Gehani, and J. Srinivasan, Odeview: The graphical interface to Ode, *Proceedings of ACM-SIGMOD 1990 International Conference on Management of Data, Atlantic City, N.J.,* pages 34–43, May 1990). However, these systems present the user with all possible paths, and do not limit the paths to the relevant ones. They do not use a threshold to determine relevancy either. This is also true for other systems such as ISIS (Please see, P. C. Kanellakis, K. J. Goldman, S. A. Goldman and S. B. Zdonik, Isis: Interface for a semantic information system, *Proceedings of ACM-SIGMOD 1986 International Conference on Management of Data, Austin,* 1985).

SUMMARY OF THE INVENTION

It is therefore an important object of the present invention to overcome one or more disadvantages and limitations of the prior art.

It is a primary object of the present invention to automate how information is optimally displayed on a small computer display.

It is another object of the present invention to display information about a related subset of all the data at any one time.

It is another object of the present invention to prioritize related subsets of data to determine how to display the information.

The present invention is a method for presenting information on display devices of varying sizes. In particular, the approach allows a user to make use of very small display surfaces, such as those found on mobile computers and personal digital assistants (PDAs). The usefulness of this method is that it determines which information the user is likely to want to examine at the same time, hence reducing the amount of data that needs to be presented at any one time. The approach can be tuned to any combination of screen size and information granularity (i.e., the size of data items).

Large schemata (consisting of numerous tables) should be split up into subsets each of which contains a smaller number of tables. Of course, each subset needs to be small enough so that it can be conveniently displayed on a small screen. A feature of the approach is that each subset contains tables that are logically related to each other in some fashion. The actual nature of the "relationship" can depend on many factors, but it is currently based on a set of queries that the user has declared to be "most likely" queries.

Summarily, the present invention is a method for sending data from a database to a computer output device where the database includes a plurality of tables for holding the data. The database has a schema indicative of relationships between the tables. The tables have attributes which contain the data. The method comprises the step of processing a query of the database where the query contains query tables. Another step is to determine weights for each of the query table pairs where the weights are indicative of the occurrence of these query tables together in previous queries. Also the method performs the step of determining sets of the query tables based on the weights, and sending to the computer output device one of the sets.

BRIEF DESCRIPTION OF THE DRAWINGS

Additional advantages and features of the present invention will become apparent from the subsequent description and the appended claims, taken in conjunction with the accompanying drawings, in which:

DETAILED DESCRIPTION OF THE INVENTION

Figure 1:
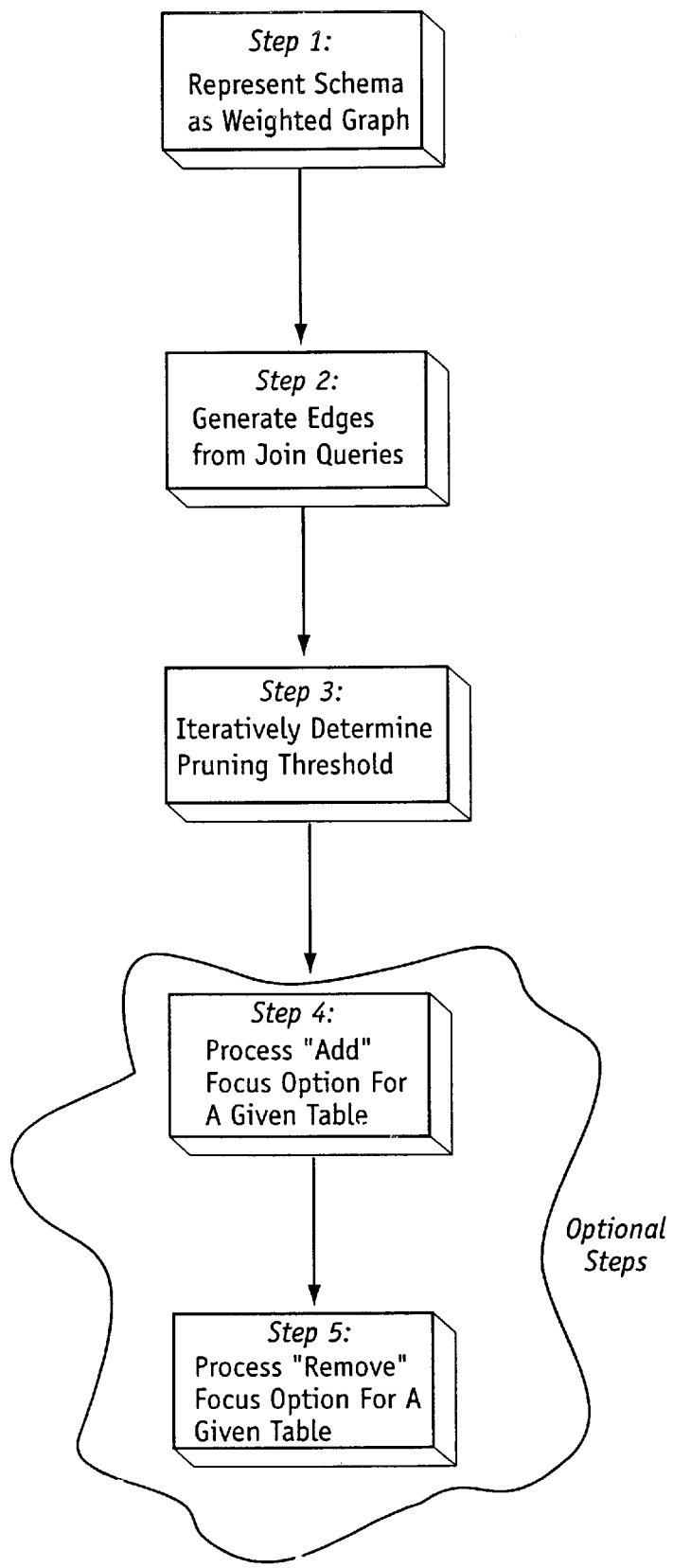
FIG. 1 is functional flow block diagram showing the top-level functions for performing the method for presenting information on display devices of varying sizes.

As shown in FIG. 1, the method consists of performing the following steps.

1. Represent the schema in the form of a weighted graph G. This step is performed at block 20.
2. Use join queries, if any, from the set of frequently executed queries to generate edges belonging to the graph G. This step is performed at block 30.
3. Find a threshold value, t, such that after pruning the graph by dropping edges with weights lower than t, the largest connected sub-schemata that are obtained from the pruned graph can be displayed on the screen completely. This is an iterative process. This step is performed at block 40.
4. Individual tables can be made the focus which adds emphasis to relationships with respect to a given table. This step is performed at block 50.
5. Eventually, focus can also be removed from tables which were initially made foci. Block 60 performs this step.

Block 50 and block 60 are optional steps for the present invention. They can be added to increase the functionality of the present invention, but even when added, they may not always be performed. The material below describes each of the steps in greater detail.

GRAPHICAL REPRESENTATION OF SCHEMA

Suppose a set of queries that a user executes often on the database is accessible. Typically, many of these queries would involve join operations between multiple tables. Consider representing the database schema by a weighted graph, G, consisting of nodes, {N} and edges {E}. Each column in each table of the schema (i.e., each attribute) is represented by a node in this graph. Any binary join operation involving a pair of attributes can be represented by an edge (of weight 1) between the attributes (i.e. nodes in the graph) in the join. As more queries are considered, if there is already an edge between two attributes, the weight of the edge is increased by one.

The pseudocode for this procedure of creating a weighted graph, G, is as follows:

```
Create weighted graph G;
For each column of each table forms node n in graph G, Initialize set
                of edges E to NULL;
For each join query J involving tables T_i and T_j begin
    if edge e involving T_i and T_j already exists in E
    then
        add 1 to weight of e
    else
        create edge e and associate it with T_i and T_j,
        set weight of e to be 1
    end if
end
```

The graph thus constructed represents the strength of relationships between columns of tables in the database schema.

PRUNING THE GRAPH

Once this graph is constructed, the graph is then pruned by dropping all edges whose weight is below some selected threshold value. The threshold value is chosen in an iterative manner so that the largest resulting subset of tables still fits in the available screen space.

The resulting graph is processed to choose sets of tables which are connected to each other by at least one edge whose weight exceeds the threshold value. Each set of such connected tables forms what is termed a Table Connected Schema Sub-component (TCSS) of the graph, or simple connected schema sub-component. Notice that the notion of connected sub-components in the graph is not the same as the traditional meaning of the term in graph theory. Here, the fact that individual nodes of the graph belong to a parent table is exploited. Two tables are connected if there is an edge between any of their component nodes (i.e., columns).

The mechanism to obtain Table Connected Schema Sub-components is described in the following pseudocode:

```
For every edge e in G with weight < threshold, delete e from G
Resultant graph is G'
Initialize Remaining Tables {RT} to be set of all tables in metadata
Initialize current-set, {CS} to NULL
repeat forever
begin
    if {RT} is empty
    then
        Output tables in {CS} as the last TCSS
        exit loop
    end if
    t = any table from {RT}
    remove t from {RT}
    add t to {CS}
    for every edge e in G that is associated with any table t' in CS
    begin
        edge e is associated with tables t' and t_other
        add t_other to {CS}
        remove e from G
    end for
end repeat
```

Figure 2:
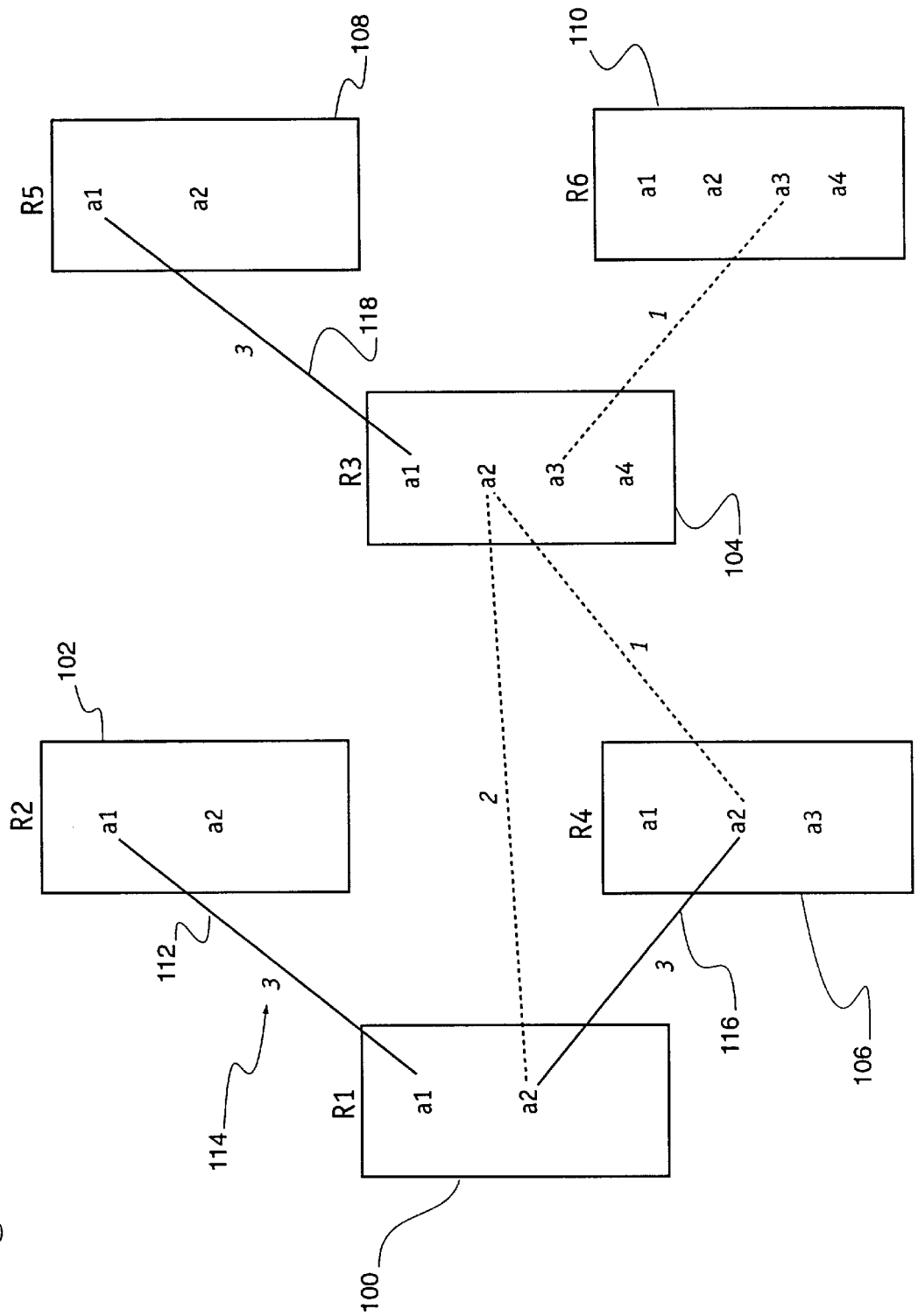
FIG. 2 is an entity relationship diagram showing a database schema as an example of how to determine Table Connected Schema Subcomponents (TCSSs)

An example is shown in FIG. 2. The schema contains 6 tables and each table ($R_1$ 100, $R_2$ 102, $R_3$ 104, $R_4$ 106, $R_5$ 108, $R_6$ 110) contains columns as shown ($a_1$, $a_2$ etc.). The columns with edges drawn between them (both solid as well as dotted) correspond to the join paths derived from a set of SQL queries against these tables. For example, there is a join path 114 between $R_1$–$a_1$ and $R_2$–$a_1$. The number above each edge indicates the weight of the edge. For example, join path 112 has weight 114 of "3". The graph corresponding to this schema contains 17 nodes (one for each column in every table in the schema), and 6 edges as drawn in FIG. 2. Given a threshold value of 3, the only three edges which have at least this value are shown as solid lines in the FIG. 2: join path 112, join path 116, and join path 118. The edges with dotted lines are those whose weights are lower than the threshold value. Such a graph yields three connected sub-components: $S_1$ containing tables $R_1$ 100, $R_2$ 102 and $R_4$ 106; $S_2$ containing tables $R_3$ 104 and $R_5$ 108; and $S_3$ containing just table $R_6$ 110.

It should be understood that the present invention is not limited to the situation where the database resides solely on one computer, but also encompasses the situation where the database and its tables may be distributed across several computers. Also, the present invention is not limited to where tables to be queried are contained only in one database, but may be found in several databases.

By choosing the threshold value appropriately (depending on the weights of the edges and connectivity of nodes in the original graph, as well as the display size), a set of connected schema sub-components can be constructed such that each set of tables fits in one display screen. Notice that these tables are logically connected to each other since they are derived from frequently occurring join paths between them. Considering that the join paths were themselves obtained from a suite of frequently used queries, it is expected that these table groupings represent the information that a user would like to see together. If the initial threshold chosen is too high, there may be many sub-components which contain very few tables together. Therefore the threshold value is reduced until a suitable value is found.

Notice also that if no join information is available, there are many sub-components each of which contains just one individual table, i.e. there will be as many TCSSs as tables in the schema. This corresponds to the situation where the preprocessing has been unable to yield natural groupings of tables in the schema. The user may choose to either view the tables one by one or view all the tables together and use traditional methods of navigation (such as scroll bars).

Figure 3:
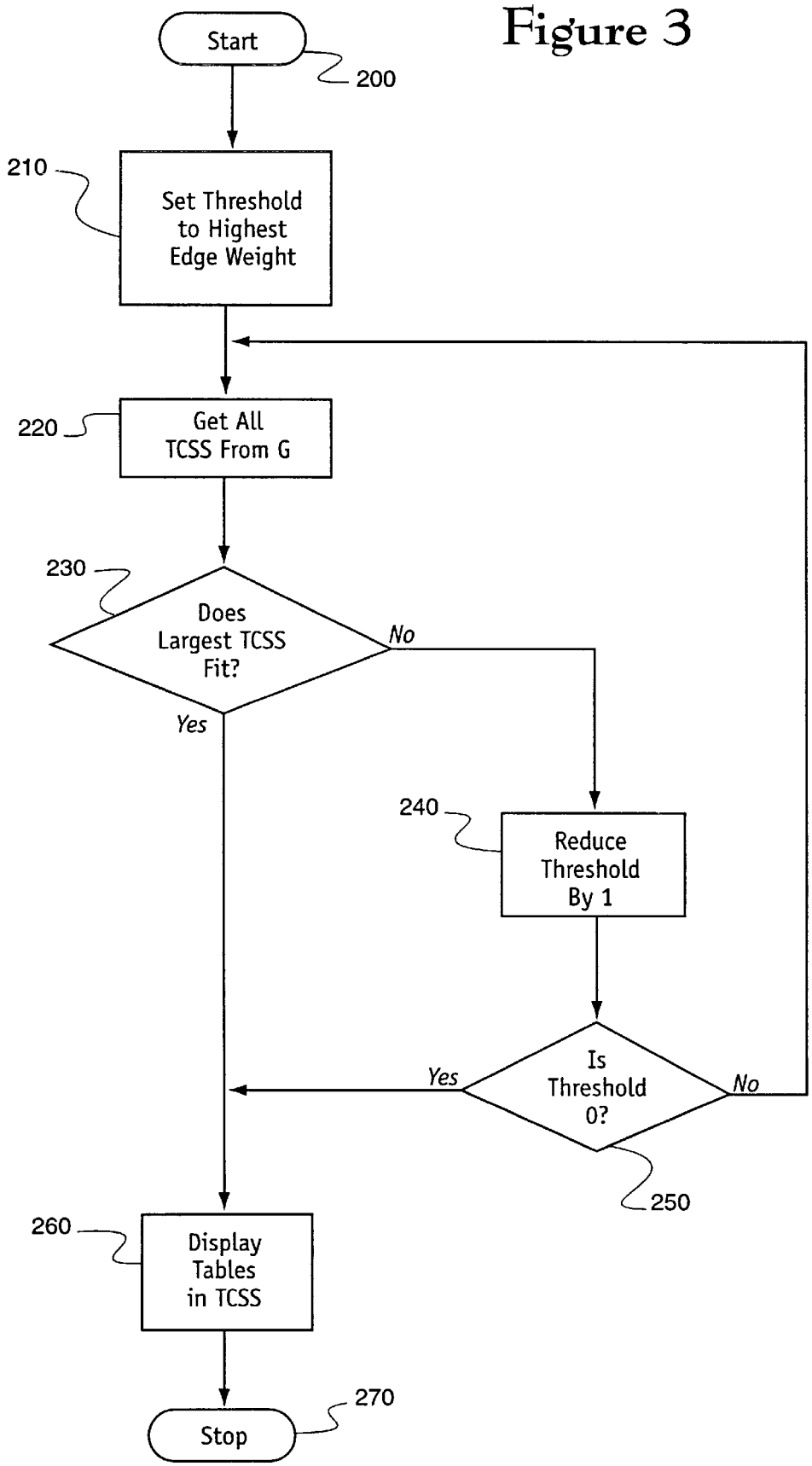
FIG. 3 is a flowchart showing how a set of tables is chosen in determining the TCSSs.

FIG. 3 shows how the correct set of tables to be displayed is chosen. The start block 200 indicates that processing begins at block 210. Block 210 sets the threshold to the highest edge weight. Block 220 gets all the TCSS from graph G. Decision block 230 inquires whether the largest TCSS can fit within the size of the computer output display. If it cannot, then block 240 reduces the threshold by 1. Decision block 250 inquires whether the threshold is 0. If it is, processing continues at block 260; else processing returns to block 220.

If decision block 230 determines that the largest TCSS can fit within the size of the computer output display, then block 260 displays the tables that are in the TCSS. Processing for this aspect of the present invention then terminates at stop block 270.

ADDING FOCUS TO A TABLE

For each of the tables displayed, only those columns that participate in joins between the various tables are displayed on the screen. Once a group of related tables is presented to the user, there is an option of making a specific table the focus. Making a table a focus involves displaying all the columns of the given table, and in addition, all other columns (belonging to other tables) that share an edge with columns belonging to the table in focus. This results in displaying all the tables which have columns sharing edges with the columns of the table in focus. The additional tables that are now displayed are those which share edges with the columns of the table in focus—regardless of the weight of the edge involved.

In this fashion, a user could navigate the entire schema by making different tables the focus. Of course, if when a particular table is made the focus and too many other associated tables are to be shown, there can be scrolling through the screen or having a second threshold value to prune the number of items being displayed. The idea of making a table the focus is to indicate interest in all other tables that are logically related to this focused table.

For example, referring back to FIG. 2, while displaying sub-component $S_2$ only tables $R_3$ 104 and $R_5$ 108 are shown on the screen. If, now, $R_3$ 104 is made the focus, the additional tables that are displayed alongside the original two tables are $R_4$ 106, $R_6$ 110 and $R_1$ 100, since all these tables have edges in common with columns in $R_3$ 104.

Figure 4:
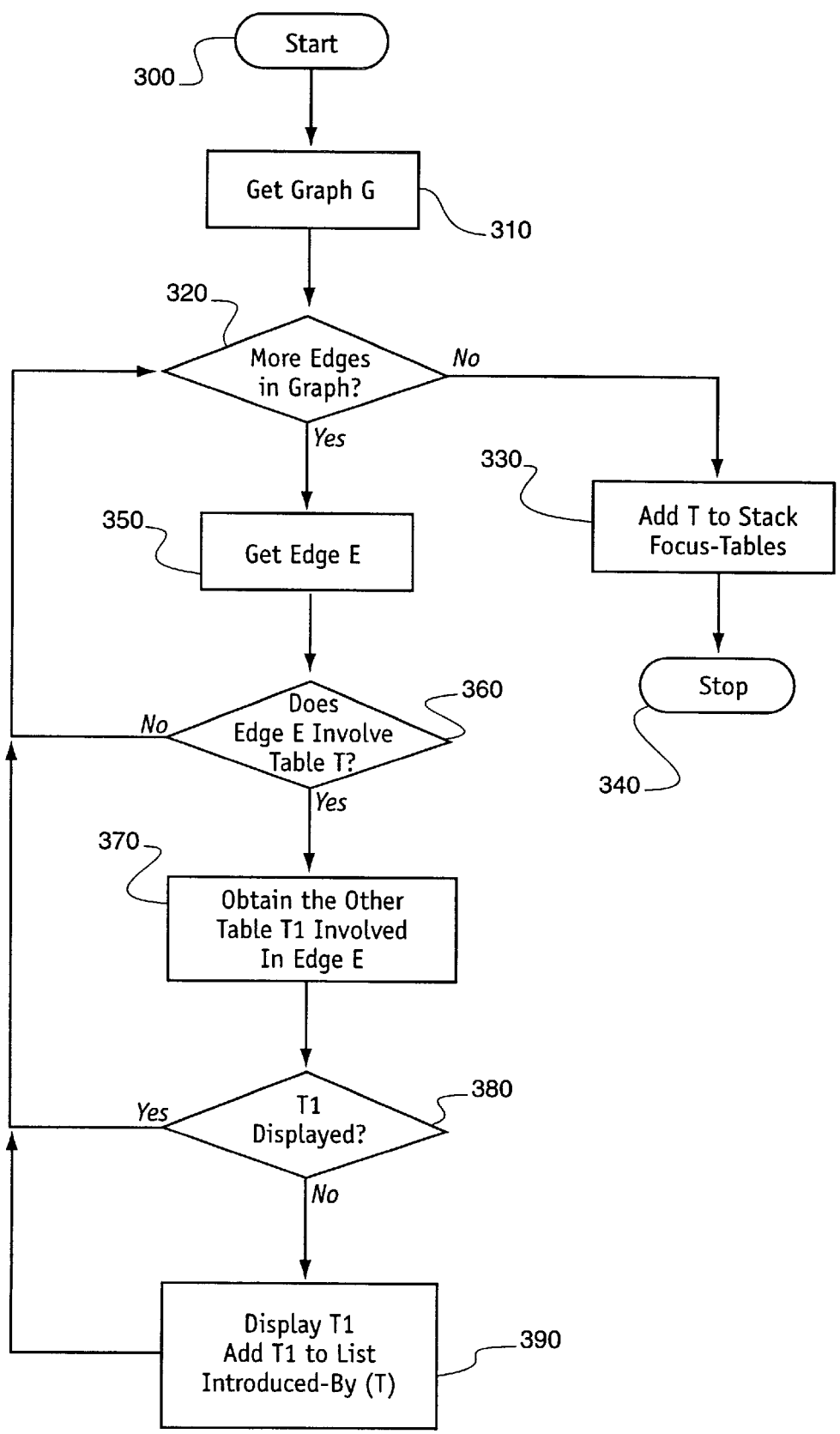
FIG. 4 is a flowchart showing the procedure of making a table the focus of a query.

FIG. 4 shows this procedure of making table T the focus. The start block 300 indicates that processing begins at block 310. Block 310 gets the graph G. Decision block 320 determines if there are more edges in the graph. If there are no more, then block 330 adds table T to the set of focus tables and processing for this aspect of the invention terminates at stop block 340.

If Decision block 320 determines that there are more edges in the graph, then block 350 gets edge E. Next, decision block 360 determines if that edge E involves table T. If it does not, then processing returns to decision block 320. If decision block 360 does determine that edge E involves table T, then block 370 obtains the other table T1 involved in edge E. Processing continues at decision block 380.

If Decision block 380 determines that T1 is displayed, then processing returns to decision block 320. If it is not, then block 390 displays T1 and adds T1 to the list as introduced by T.

REMOVING FOCUS FROM A TABLE

When a table is removed as the focus, all the tables containing edges of weights lower than the threshold value that the table of focus introduced into the display are removed. Since there is no guarantee that the user will remove tables as focus in the reverse order that they were made foci, the order in which tables were made foci is maintained so that they can be undone in the reverse order. This is somewhat similar to hypertext navigation systems, i.e. navigation of a schema in this fashion is akin to a stack of traversals.

The first degree neighbors of a table, T, is defined to be all other tables whose columns share an edge with columns from T. This is a schema wherein making a table the focus involves displaying all first degree neighbors of this table. One could extend this notion and display nth order neighbors where n is a tunable parameter.

Figure 5:
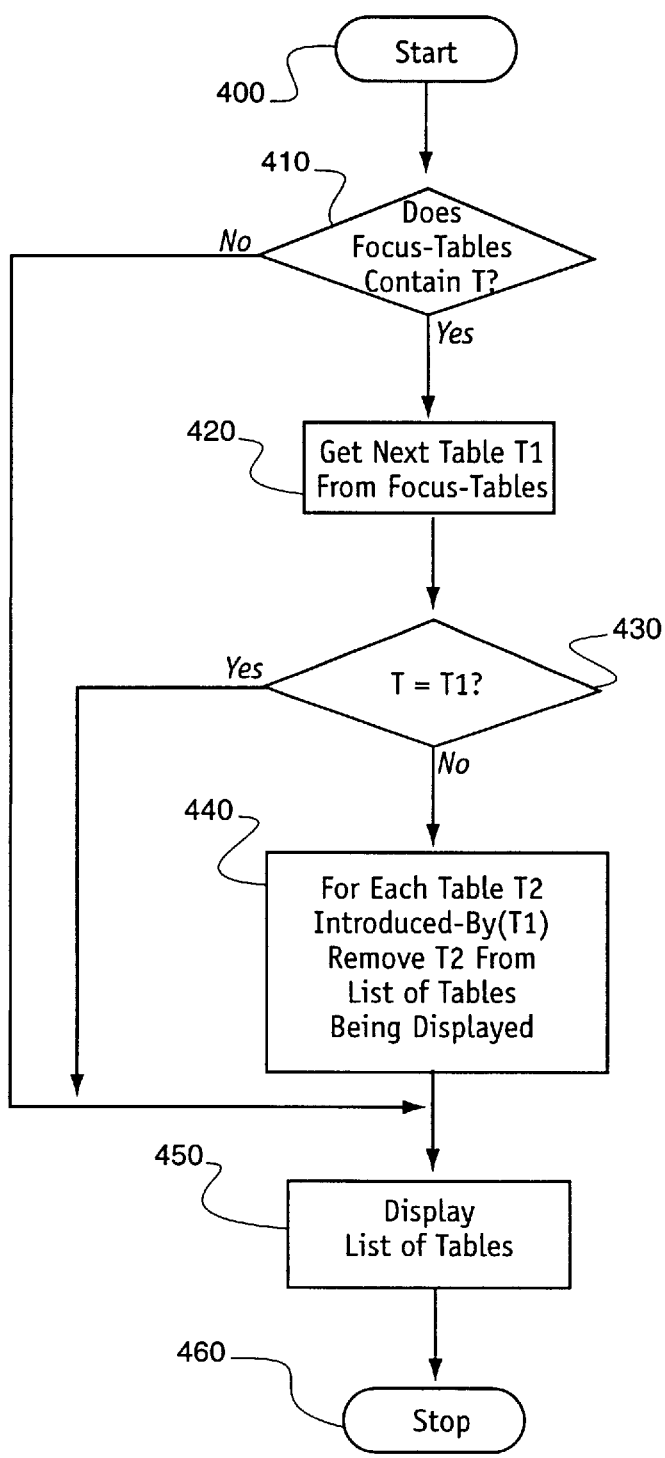
FIG. 5 is a flowchart showing the procedure of removing focus from a table.

FIG. 5 shows this procedure of removing focus from table T. The start block 400 indicates that processing begins at decision block 410. If decision block 410 determines that the focus-tables do not contain table T, then processing branches to block 450 which will be discussed below. If decision block 410 determines that the focus-tables do contain table T, then processing continues at block 420 which gets the next table T1 from the focus-tables.

Decision block 430 determines if table T is the same as table T1. If they are, then processing branches to block 450. If T is not the same as T1, then for each table T2, block 440 removes table T2 from the list of tables being displayed. Block 450 displays the list of tables and processing terminates for this aspect of the invention at the stop block 460.

EXAMPLE

Figure 6:
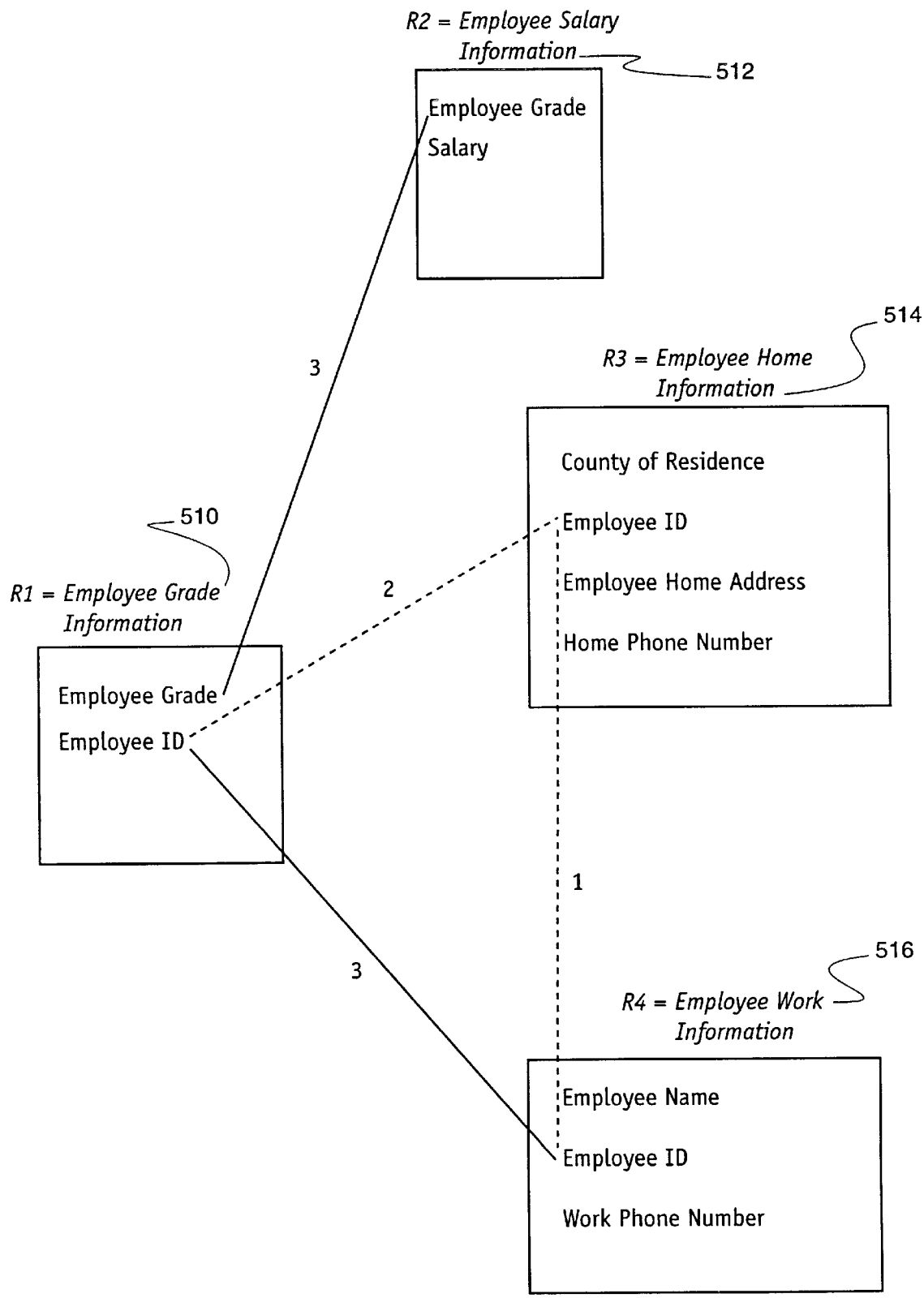
FIG. 6 is an entity relationship diagram showing a database schema with sample relationship and attribute values.

The following example uses tables R1 510, R2 512, R3 514, R4 516 with the relationships shown in FIG. 6 (these relationships are similar to the ones shown in FIG. 2).

Table R1 may assume the following values:

| Employee Grade | Employee Id |
|---|---|
| 1 | 354 |
| 1 | 355 |
| 1 | 356 |
| 2 | 320 |
| 2 | 322 |
| 2 | 327 |
| 2 | 328 |
| 3 | 301 |
| 3 | 302 |
| * | * |
| * | * |
| * | * |
| 20 | 1 |

Table R2 may assume the following values:

| Employee Grade | Salary |
|---|---|
| 1 | $15,000 |
| 2 | $15,500 |
| 3 | $15,750 |
| * | * |
| * | * |
| * | * |
| 20 | $150,000 |

Table R3 may assume the following values:

| County of Residence | Employee Id | Employee Home Address | Home Phone Number |
|---|---|---|---|
| Cuyahoga | 1 | 123 Main Street | (301) 588-8437 |
| * | * | * | * |
| * | * | * | * |
| * | * | * | * |
| Westview | 301 | 345 Dogwood Road | (315) 384-4823 |
| Timberwood | 302 | 2441 Wakefield Drive | (315) 384-4341 |
| Cuyahoga | 320 | 842 Dirger Street | (301) 588-3429 |
| Westview | 322 | 142 Beaumont Blvd. | (315) 384-6893 |
| Westview | 327 | 251 Troy Street | (315) 384-5372 |
| Westview | 328 | 623 Cardinal Road | (315) 384-5672 |
| Westview | 354 | 972 Industrial Street | (315) 384-1592 |
| Timberwood | 355 | 482 Billers Drive | (315) 384-7473 |
| Timberwood | 356 | 848 Rosemont Street | (315) 384-2492 |

Table R4 may assume the following values:

| Employee Name | Employee Id | Work Phone Number |
|---|---|---|
| B. Williams | 1 | (315) 575-2543 |
| * | * | * |
| * | * | * |
| * | * | * |
| T. Burke | 301 | (315) 575-2501 |
| K. Niems | 302 | (315) 575-2534 |
| J. Peters | 320 | (315) 575-2502 |
| O. Smith | 322 | (315) 575-2523 |
| Y. Timms | 327 | (315) 575-2587 |
| A. Gibson | 328 | (315) 575-2500 |
| R. Copston | 354 | (315) 575-2423 |
| K. Harrington | 355 | (315) 575-2599 |
| N. Sagy | 356 | (315) 575-2589 |

A user may request that data from the tables R1, R2, R3, and R4 be sent to the user's PDA screen by specifying the following query:

SELECT DISTINCTROW R1.[Employee Grade], R1.[Employee Id], R2.Salary, R4.[Employee Name], R4.[Work Phone Number], R3.[County of Residence], R3.[Employee Home Address], R3.[Home Phone Number], *
FROM ((R1 INNER JOIN R2 ON R1.[Employee Grade]=R2.[Employee Grade]) INNER JOIN R3 ON R1.[Employee Id]=R3.[Employee Id]) INNER JOIN R4 ON (R4.[Employee Id]=R3.[Employee Id]) AND (R1.[Employee Id]=R4.[Employee Id])
ORDER BY R1.[Employee Grade];

The query shown above results in the following four paths each of weight one being generated:

(R1.Employee Grade, R2.Employee Grade)
(R1.Employee Id, R3.Employee Id)
(R3. Employee Id, R4. Employee Id)
(R1.Employee Id, R4.Employee Id)

Figure 7:
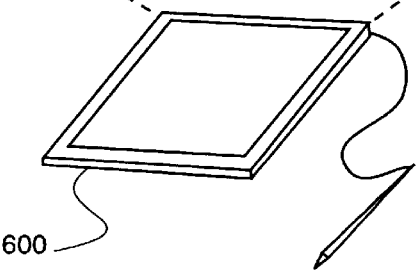
FIG. 7 is a PDA display serving as an example of the output of the present invention.

The present invention processes the query in accordance with the method disclosed above to display results 580 that will fit within the screen 590 of the PDA 600 as shown in FIG. 7.

The preferred embodiment has a SQL parser that, given, a set of queries (Select queries) produces join path sets of the form $R_i.A_j, R_k.A_l$ . . . Each such set contains attributes that occur together in a single query and contribute one edge for every pair in the set. Using the above sets of generated join path information and a schema's metadata (i.e. names of tables and their columns), another program generates the graph describing the path information. Given a threshold (currently an integer value), this program then generates the various sub-components of the graph with table grouping information. There is also a command line interface which allows different tables to be the focus (and subsequently remove them). All the code mentioned above runs on Unix, but the present invention is not limited to this specific software.

For example, another embodiment can run on Windows 3.1. Given a schema and a threshold value, the program determines the largest connected sub-component and displays it on the screen. Using mouse interactions, different tables can be made foci (and, later, removed as foci as well) in the manner discussed earlier.

Figure 8:
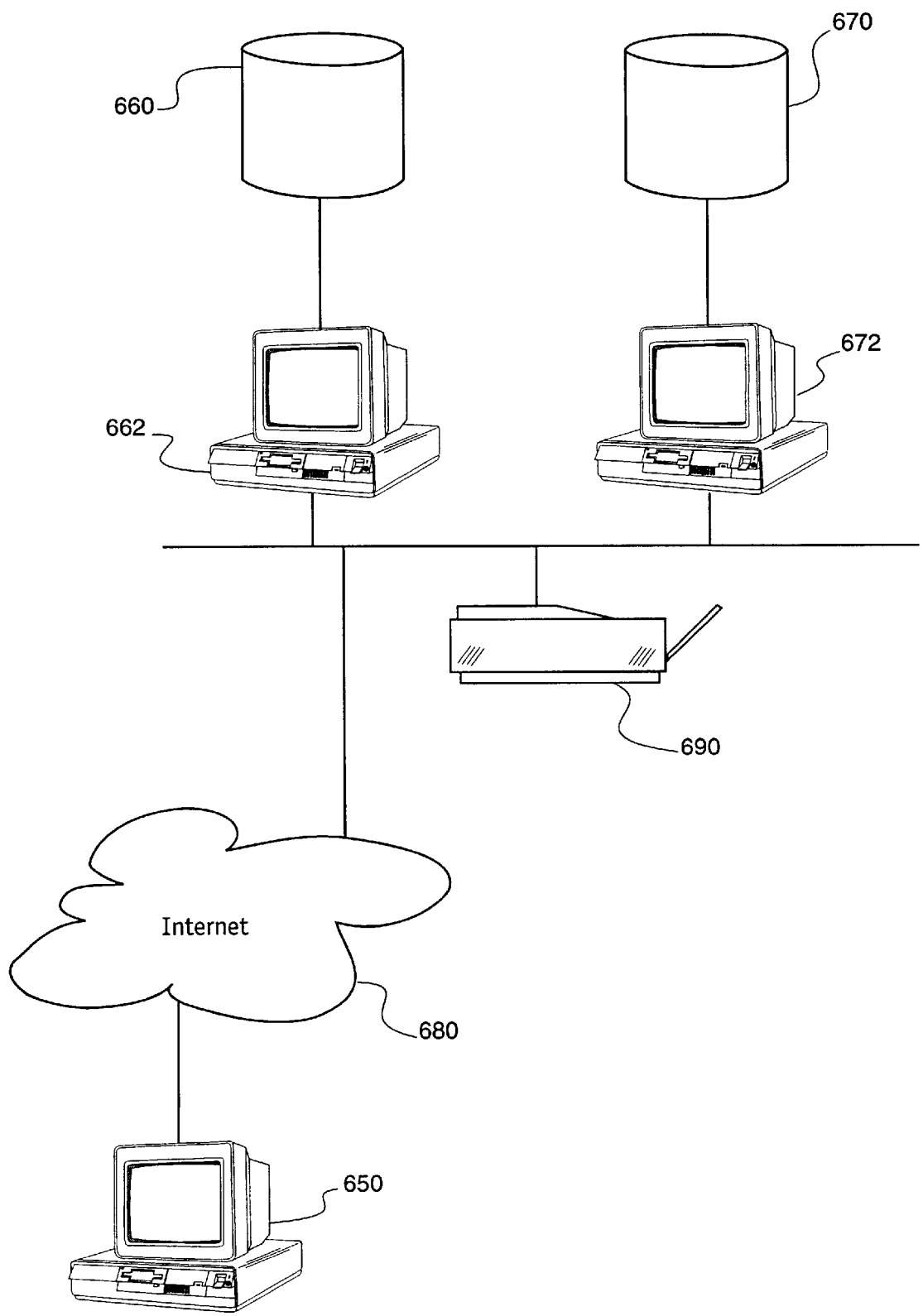
FIG. 8 is a network diagram showing tables placed in separate databases across the network which is connected to a printer and the Internet.

FIG. 8 shows another embodiment of the invention. FIG. 8 is a network diagram showing tables placed in separate databases across a local network which is connected to a printer and the Internet. A user on computer 650 may query for information contained in tables contained in database 660 on computer 662 and database 670 on computer 672. This embodiment can use the present invention to prioritize information that is to be sent across a network (such as the Internet 680). In this situation, the present invention can send information to the user on computer 650 which the user is more likely to primarily wish to view. The present invention can also direct the output to a printer 690 located on a local network 700.

The embodiments which have been set forth above were for the purpose of illustration and were not intended to limit the invention. It will be appreciated by those skilled in the art that various changes and modifications may be made to the embodiments described in this specification without departing from the spirit and scope of the invention as defined by the appended claims.

We claim:

1. A method for sending data from a database to a computer output device, said database including a plurality of tables for holding said data, said database having a schema indicative of relationships between said tables, said tables having attributes, said attributes containing said data, the method comprising:

processing a query of said database, said query containing query tables;

determining weights for each pair of query tables, said weights being indicative of occurrence of said query table pairs in previous queries;

determining sets of said query table pairs based on said weights; and sending to said computer output device one of said sets which contains query tables specified in said query.

2. The method of claim 1 wherein said relationships are join relationships between said query tables.

3. The method of claim 1 wherein said computer output device is a computer screen.

4. The method of claim 3 wherein the set of said sending step is substantially displayed within display size of the computer output device.

5. The method of claim 4 wherein size of said computer screen is smaller than size of a standard desktop computer screen.

6. The method of claim 1 wherein said computer output device is a printer.

7. The method of claim 1 wherein said computer output device receives said set of said sending step through a network.

8. The method of claim 1 further comprising the step of:

grouping said query tables whose said weights satisfy a grouping threshold level.

9. The method of claim 8 wherein said grouping threshold level is based upon display size of the computer output device so that each said set of said sending step can be substantially displayed within display size of the computer output device.

10. The method of claim 1 wherein the database contains said tables located on a plurality of computers.

11. The method of claim 1 further comprising the step of:

selecting one of said query tables for a focused display on said computer output device, said focused display providing for displaying all attributes of said selected query table and all attributes of neighbors of said selected query table on said computer output device, said neighbors being tables having at least one of said relationships with said selected query table.

12. The method of claim 11 further comprising the step of:

scrolling through the display of the computer output device for viewing said focused display.

13. An apparatus for sending data from a database to a computer output device, said database including a plurality of tables for holding said data, said database having a schema indicative of relationships between said tables, said tables having attributes, said attributes containing said data, comprising:

means for processing a query of said database, said query containing query tables;

means for determining weights for each pair of query tables, said weights being indicative of occurrence of said query table pairs in previous queries;

means for determining sets of said query table pairs based on said weights; and means for sending to said computer output device one of said sets which contains query tables specified in said query.

14. The apparatus of claim 13 wherein said relationships are join relationships between said query tables.

15. The apparatus of claim 13 wherein said computer output device is a computer screen.

16. The apparatus of claim 15 wherein the set of said sending means is substantially displayed within display size of the computer output device.

17. The apparatus of claim 16 wherein size of said computer screen is smaller than size of a standard desktop computer screen.

18. The apparatus of claim 13 wherein said computer output device is a printer.

19. The apparatus of claim 13 wherein said computer output device receives said set of said sending means through a network.

20. The apparatus of claim 13 further comprising:

means for grouping said query tables whose said weights satisfy a grouping threshold level.

21. The apparatus of claim 20 wherein said grouping threshold level is based upon display size of the computer output device so that each said set of said sending means can be substantially displayed within display size of the computer output device.

22. The apparatus of claim 13 wherein the database contains said tables located on a plurality of computers.

23. The apparatus of claim 13 further comprising:

means for selecting one of said query tables for a focused display on said computer output device, said focused display providing for displaying all attributes of said selected query table and all attributes of neighbors of said selected query table on said computer output device, said neighbors being tables having at least one of said relationships with said selected query table.

24. The apparatus of claim 23 further comprising:

means for scrolling through the display of the computer output device for viewing said focused display.

* * * * *